(12) United States Patent
Blum et al.

(10) Patent No.: US 10,661,421 B2
(45) Date of Patent: May 26, 2020

(54) TOOL ATTACHMENT FOR A HANDHELD POWER TOOL

(71) Applicant: Robert Bosch GmbH, Stuttgart (DE)

(72) Inventors: Jens Blum, Filderstadt (DE); Heiko Roehm, Stuttgart (DE); Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 502 days.

(21) Appl. No.: 15/069,668

(22) Filed: Mar. 14, 2016

(65) Prior Publication Data

US 2016/0303729 A1 Oct. 20, 2016

(30) Foreign Application Priority Data

Apr. 14, 2015 (DE) .................. 10 2015 206 634

(51) Int. Cl.
*B25F 3/00* (2006.01)
*B25D 11/00* (2006.01)
(Continued)

(52) U.S. Cl.
CPC .............. *B25F 3/00* (2013.01); *B23B 45/003* (2013.01); *B25B 21/023* (2013.01); *B25B 23/0035* (2013.01); *B25D 11/00* (2013.01); *B25D 11/08* (2013.01); *B25D 17/04* (2013.01); *B25D 17/088* (2013.01); *B25D 17/24* (2013.01); *B25F 5/026* (2013.01); *B25D 2250/025* (2013.01)

(58) Field of Classification Search
CPC ... B25B 21/023; B25B 23/0035; B25D 11/00; B25D 11/08; B25D 17/088; B25D 17/04; B25D 17/24; B25D 2250/025; B25D 17/005; B25D 16/00; B25D 2216/0015; B25F 5/026; B25F 3/00; B23B 45/003
See application file for complete search history.

(56) References Cited

U.S. PATENT DOCUMENTS

| 1,665,173 A | * | 4/1928 | Misener | ............... | B25D 17/005 |
| | | | | | 173/203 |
| 2,724,573 A | * | 11/1955 | Lundquist | ............ | B25D 11/106 |
| | | | | | 173/205 |

(Continued)

FOREIGN PATENT DOCUMENTS

CN 201124406 Y 10/2008
DE 3522255 A1 1/1987
(Continued)

*Primary Examiner* — Chelsea E Stinson
*Assistant Examiner* — Thomas M Wittenschlaeger
(74) *Attorney, Agent, or Firm* — Norton Rose Fulbright US LLP; Gerard Messina

(57) ABSTRACT

In a tool attachment for a handheld power tool, which includes a tool housing having a fastening interface, having an attachment housing, on which a locking unit, for locking the tool attachment on the fastening interface of the handheld power tool, and a tool receptacle for accommodating an insert tool are situated, a percussion mechanism is situated in the attachment housing, which is configured to apply percussions carried out in the axial direction in relation to the tool receptacle to an insert tool, which is situated in the tool receptacle, during percussion operation of the tool attachment, the tool receptacle being fixed in position in the attachment housing in a non-rotating way at least during percussion operation.

14 Claims, 5 Drawing Sheets

(51) Int. Cl.
  *B25D 17/04* (2006.01)
  *B25F 5/02* (2006.01)
  *B23B 45/00* (2006.01)
  *B25B 21/02* (2006.01)
  *B25B 23/00* (2006.01)
  *B25D 17/08* (2006.01)
  *B25D 11/08* (2006.01)
  *B25D 17/24* (2006.01)

(56) References Cited

U.S. PATENT DOCUMENTS

| | | | | |
|---|---|---|---|---|
| 3,097,858 A * | 7/1963 | Amundsen | B25D 17/082 | 279/19.1 |
| 3,371,725 A * | 3/1968 | Jansen | B25D 11/106 | 173/205 |
| 4,007,795 A * | 2/1977 | Gawron | B25B 21/007 | 173/50 |
| 4,111,060 A * | 9/1978 | Nerini | B23Q 5/027 | 144/35.2 |
| 4,450,919 A * | 5/1984 | Cousineau | B25D 17/005 | 173/29 |
| 4,489,792 A * | 12/1984 | Fahim | B25D 11/106 | 173/29 |
| 4,770,254 A * | 9/1988 | Kominami | B25D 11/062 | 173/109 |
| 5,329,802 A * | 7/1994 | Nunez | B21D 1/06 | 72/457 |
| 5,379,848 A * | 1/1995 | Rauser | B25D 16/003 | 173/109 |
| 5,711,380 A * | 1/1998 | Chen | A62C 2/065 | 173/109 |
| 5,820,312 A * | 10/1998 | Stock | B25D 16/00 | 408/17 |
| 5,992,538 A * | 11/1999 | Marcengill | B25D 11/102 | 173/171 |
| 6,089,330 A * | 7/2000 | Miescher | B25D 17/005 | 173/104 |
| 6,223,833 B1 * | 5/2001 | Thurler | B25D 16/00 | 173/109 |
| 6,286,611 B1 * | 9/2001 | Bone | B25F 3/00 | 173/170 |
| 7,096,972 B2 * | 8/2006 | Orozco, Jr. | B25D 11/102 | 173/114 |
| 9,532,789 B2 * | 1/2017 | Coope | A61B 17/162 | |
| 2003/0089509 A1 * | 5/2003 | Wanek | B25D 17/088 | 173/48 |
| 2004/0050568 A1 * | 3/2004 | Orozco, Jr. | B25D 11/102 | 173/100 |
| 2004/0231866 A1 * | 11/2004 | Droste | B25D 16/006 | 173/48 |
| 2006/0137888 A1 * | 6/2006 | Soika | B25D 16/006 | 173/48 |
| 2006/0207776 A1 * | 9/2006 | Hahn | B25D 11/104 | 173/49 |
| 2006/0237205 A1 * | 10/2006 | Sia | B25B 21/00 | 173/48 |
| 2006/0254044 A1 | 11/2006 | Hao | | |
| 2007/0079979 A1 * | 4/2007 | Braun | B23B 45/003 | 173/29 |
| 2009/0145618 A1 * | 6/2009 | Duesselberg | B25D 16/006 | 173/48 |
| 2009/0308626 A1 * | 12/2009 | Saur | B25D 11/062 | 173/48 |
| 2010/0032179 A1 * | 2/2010 | Hanspers | B25F 3/00 | 173/11 |
| 2010/0038104 A1 * | 2/2010 | Baumann | B25D 16/003 | 173/162.1 |
| 2010/0044063 A1 * | 2/2010 | Chen | B23B 45/003 | 173/93.5 |
| 2011/0094765 A1 * | 4/2011 | Aldrich | B23B 37/00 | 173/114 |
| 2011/0127054 A1 * | 6/2011 | Chen | B23B 31/1071 | 173/114 |
| 2011/0272172 A1 * | 11/2011 | Lau | B25F 3/00 | 173/170 |
| 2013/0020106 A1 * | 1/2013 | Kuehne | B25F 3/00 | 173/214 |
| 2013/0118767 A1 * | 5/2013 | Cannaliato | B25F 5/021 | 173/29 |
| 2013/0161043 A1 * | 6/2013 | Blum | B25D 16/006 | 173/48 |
| 2013/0228355 A1 * | 9/2013 | Kuehne | B25F 5/02 | 173/29 |
| 2014/0131958 A1 * | 5/2014 | Roehm | B25F 3/00 | 279/133 |
| 2014/0131959 A1 * | 5/2014 | Tussing | B25F 3/00 | 279/143 |
| 2014/0133898 A1 * | 5/2014 | Tussing | B25F 3/00 | 403/103 |
| 2014/0332243 A1 * | 11/2014 | Baskar | B25F 3/00 | 173/29 |
| 2014/0346744 A1 * | 11/2014 | Herr | B25F 3/00 | 279/144 |
| 2015/0115554 A1 * | 4/2015 | Tussing | B25F 3/00 | 279/140 |
| 2015/0321305 A1 * | 11/2015 | Saur | B25F 3/00 | 173/29 |
| 2016/0052119 A1 * | 2/2016 | Yamada | B25D 17/20 | 173/117 |
| 2016/0136801 A1 * | 5/2016 | Furusawa | B25F 5/026 | 173/162.2 |
| 2016/0151905 A1 * | 6/2016 | Tada | B25D 17/24 | 173/210 |
| 2016/0271781 A1 * | 9/2016 | Kobayashi | B25F 3/00 | |
| 2016/0346911 A1 * | 12/2016 | Blum | B25F 3/00 | |
| 2017/0197305 A1 * | 7/2017 | Rastegar | B25F 3/00 | |

FOREIGN PATENT DOCUMENTS

| | | |
|---|---|---|
| DE | 19604169 A1 | 8/1997 |
| DE | 102013213804 A1 | 5/2014 |
| DE | 202013008724 U1 | 1/2015 |

* cited by examiner

TOOL ATTACHMENT FOR A HANDHELD POWER TOOL

BACKGROUND INFORMATION

The present invention relates to a tool attachment for a handheld power tool, which includes a tool housing having a fastening interface, having an attachment housing, on which a locking unit, for locking the tool attachment on the fastening interface of the handheld power tool, and a tool receptacle, for accommodating an insert tool, are situated. In addition, the present invention relates to a tool system including a handheld power tool and such a tool attachment.

BACKGROUND INFORMATION

German patent document DE 10 2005 048 345 A1 discusses a handheld power tool auxiliary unit, which is configured as a replaceable tool attachment, including a percussion mechanism unit and a coupling unit, which is provided for coupling the percussion mechanism unit to a handheld power tool having a correspondingly configured interface. The percussion mechanism unit has a rotary percussion mechanism and is connectable to an associated insert tool. During operation of the tool attachment, which is coupled to a handheld power tool, the insert tool carries out a combined rotational and percussion movement when the rotary percussion mechanism is activated.

SUMMARY OF THE INVENTION

The present invention provides a tool attachment for a handheld power tool, which includes a tool housing having a fastening interface. The tool attachment has an attachment housing, on which a locking unit for locking the tool attachment on the fastening interface of the handheld power tool and a tool receptacle for accommodating an insert tool are situated. A percussion mechanism is situated in the attachment housing, which is configured to apply percussions, which are carried out in the axial direction in relation to the tool receptacle, to an insert tool, which is situated in the tool receptacle, during percussion operation of the tool attachment, whereby the tool receptacle is fixed in position in the attachment housing in a non-rotating way at least during percussion operation. The present invention therefore enables, as a result of the prevention of the rotational movement of the insert tool during percussion operation, professional chisel operation even in hard media, such as concrete or stone.

A drive element situated coaxially in relation to the tool receptacle may be associated with the percussion mechanism. The present invention therefore enables a compact percussion mechanism having reduced spatial dimensions to be provided.

The drive element at least sectionally may have a hexagonal outer circumference. The possible fields of use and working conditions in which the tool attachment may be used may therefore be expanded.

The tool receptacle may include an output element which is rotatable about an associated rotation axis, the rotation axis being coincident with a drive axle of the percussion mechanism. In this way, a particularly radially compact, so-called in-line construction of the tool attachment including an integrated percussion mechanism is provided.

The percussion mechanism may be configured for the direct percussive drive of the output element, which is associated with the tool receptacle, during percussion operation of the tool attachment, the output element being configured to transfer percussions carried out in the axial direction in relation to the tool receptacle directly onto an insert tool situated in the tool receptacle. In this way, a stable and robust percussion mechanism may be provided, in which a sufficiently high percussion energy may be generated in a simple way, which enables intensive chiseling work even in hard media, for example, stone or concrete.

The percussion mechanism may have a percussion body, which is spring-loaded by a spring element, and which is coupled via a ball guide with an associated spring tensioning element. The present invention therefore enables the provision of a percussion mechanism having a reliable and uncomplicated structure.

According to one specific embodiment, the percussion mechanism has an actuatable engagement clutch for activating the percussion operation of the percussion mechanism. The present invention therefore enables the provision of a percussion mechanism, in which a corresponding percussion operation may be activated and deactivated in a simple way.

The output element may be axially pre-tensioned with the aid of a spring element in a direction pointing away from the locking unit. In this way, if the insert tool is only slightly axially loaded or completely unloaded, an automatic reset from percussion operation into idle operation takes place. This case occurs if the handheld power tool is raised by the user off of the workpiece to be machined.

The engagement clutch may be configured, upon actuation against the force action exerted by the spring element, to enable a drive of the spring tensioning element for the periodic tensioning and relaxation of the spring element. Safe and reliable activation of the percussion operation of the percussion mechanism may therefore be enabled, in particular by pressing the insert tool against a workpiece to be machined.

In one refinement, the output element has a guide section, which is at least sectionally enclosed by a tool receptacle holder associated with the attachment housing, an engagement contour being provided at least sectionally between the guide section and the tool receptacle holder to provide a rotatably-fixed coupling between the tool receptacle holder and the guide section at least during percussion operation of the tool attachment. In this way, twisting of an insert tool, which is situated in the tool receptacle, in relation to the attachment housing may be avoided safely and reliably at least during percussion operation of the tool attachment.

The percussion mechanism may have a percussion body, which is spring-loaded by a spring element, and which is coupled to an associated spring tensioning element, a gear mechanism being situated in the attachment housing, which is configured to increase a speed of the spring tensioning element in relation to a speed of the drive element. The percussion force of the percussion mechanism which is required for chiseling in hard stone or concrete may therefore be provided in a simple way.

According to one specific embodiment, an auxiliary handle and/or a fastening aid is fastenable on the attachment housing. In this way, two-handed operability may be enabled in a simple way. With the aid of the fastening aid, the tool attachment may be fastened, for example, on a piece of clothing, for example, a belt or a pocket, during temporary nonuse, and nonetheless remains ready to hand at short notice.

The tool receptacle may be configured for accommodating SDS-plus, SDS-quick, and/or HEX-insert tools. The present invention therefore enables the provision of a universal tool attachment, which is usable with a variety of different insert tool types and may therefore be used in a variety of different usage conditions.

The insert tool may be configured as a chisel. As a result, chiseling work may be carried out without problems to a greater extent and in particular in hard media, for example, concrete or stone.

In addition, the present invention provides a tool system having a handheld power tool, which includes a tool housing having a fastening interface, and having a replaceable tool attachment. The replaceable tool attachment includes an attachment housing, on which a locking unit for locking the tool attachment on the fastening interface of the handheld power tool and a tool receptacle for accommodating an insert tool are situated. A percussion mechanism is situated in the attachment housing, which is configured to apply percussions carried out in the axial direction in relation to the tool receptacle to an insert tool, which is situated in the tool receptacle, during percussion operation of the tool attachment, the tool receptacle being fixed in position in the attachment housing in a non-rotating way at least during percussion operation.

The tool system including the handheld power tool with the replaceable tool attachment therefore enables intensive chiseling work in harder media, for example, concrete or stone.

The present invention is explained in greater detail in the following description on the basis of exemplary embodiments illustrated in the drawings.

DETAILED DESCRIPTION

Figure 1:
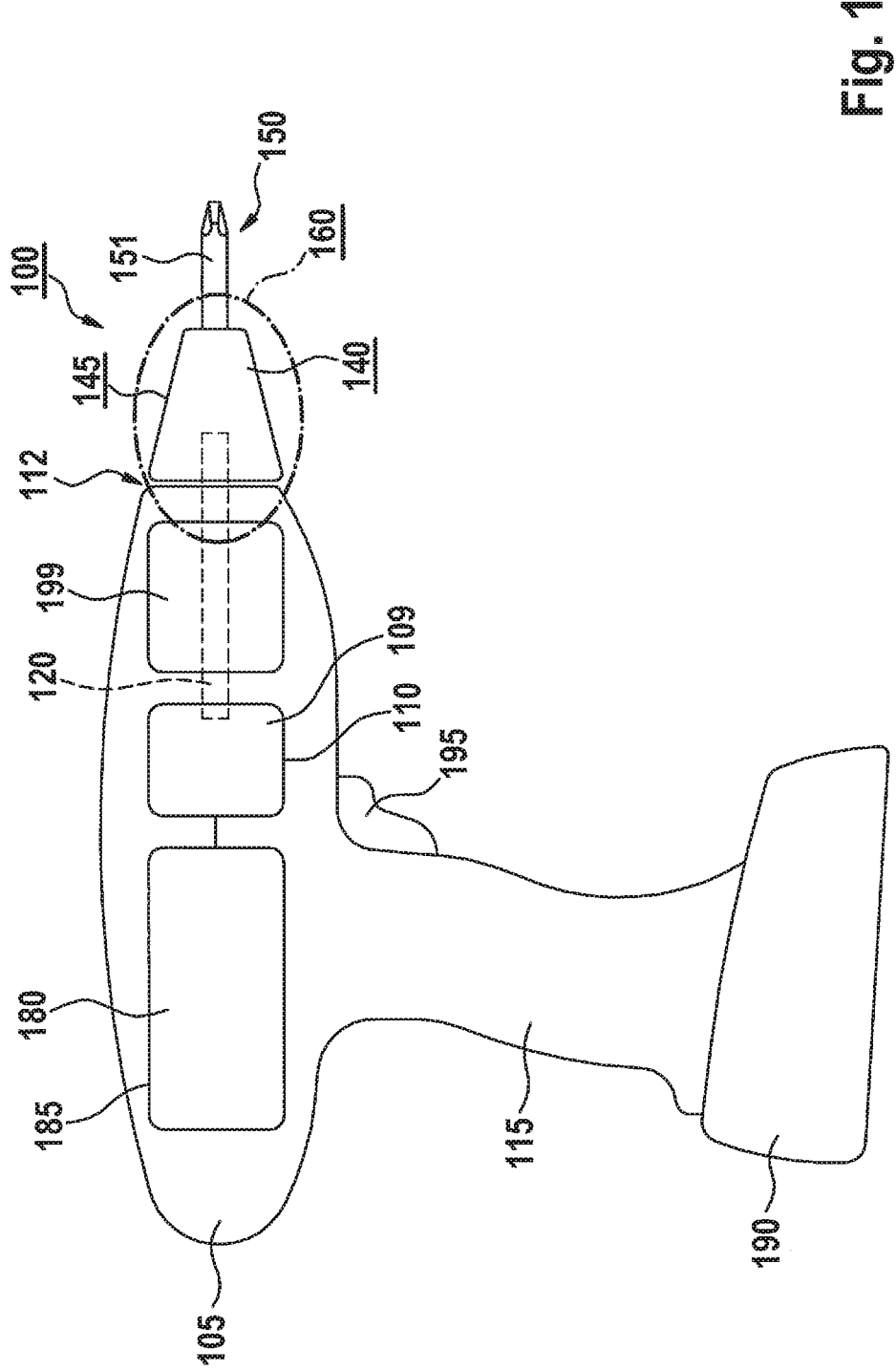
FIG. 1 shows a schematic view of a handheld power tool having a tool receptacle, which is configured as a bit holder, and a fastening interface.

FIG. 1 exemplifies a handheld power tool 100, which includes a tool housing 105 having a handle 115. According to one specific embodiment, handheld power tool 100 is mechanically and electrically connectable to a battery pack 190 for network-independent power supply. In FIG. 1, handheld power tool 100 is configured, for example, as a cordless combi drill. However, it is to be noted that the present invention is not restricted to cordless combi drills, but rather may be used in different handheld power tools, in which a tool is set into rotation, independently of whether the handheld power tool is operable in a grid-dependent or grid-independent way using battery pack 190, for example, in the case of a screwdriver or cordless screwdriver, etc.

At least one electric drive motor 180, which is supplied with power by battery pack 190, and a gear mechanism 109 may be situated in tool housing 105. Drive motor 180 may be turned on and off, for example, via a manual switch 195 and may be an arbitrary motor type, for example, an electronically commutated motor or a DC motor. Gear mechanism 109 may be configured, for example, as a reduction gear mechanism, which is implementable, for example, as a planetary gear provided with various planetary stages, with which a torque clutch 199 is optionally associated. The functionality and the construction of a suitable drive motor and a suitable gear mechanism and also a suitable torque clutch and the functionality thereof are sufficiently known to those skilled in the art, so that a depiction and detailed description thereof will be omitted here for the purpose of conciseness of the description and simplicity of the drawings.

Gear mechanism 109 is situated as an illustration in a gear housing 110 and drive motor 180 is situated in a motor housing 185, gear housing 110 and motor housing 185 being situated in tool housing 105. Drive motor 180 is connected via gear mechanism 109 to a driveshaft 120, for example, a drive spindle. During operation of handheld power tool 100, motor 180 rotatably drives driveshaft 120 via gear mechanism 109. According to the specific embodiment shown here, handheld power tool 100 is associated with a tool receptacle 140 for accommodating an insert tool 150. Tool receptacle 140 is provided here, solely as an example, as a bit holder 145 for accommodating a screwdriver bit 151. Tool receptacle 140 may be integrally formed onto driveshaft 120, which is drivable by drive motor 180 via gear mechanism 109, or may be connected thereto in the form of an attachment.

Figure 2:
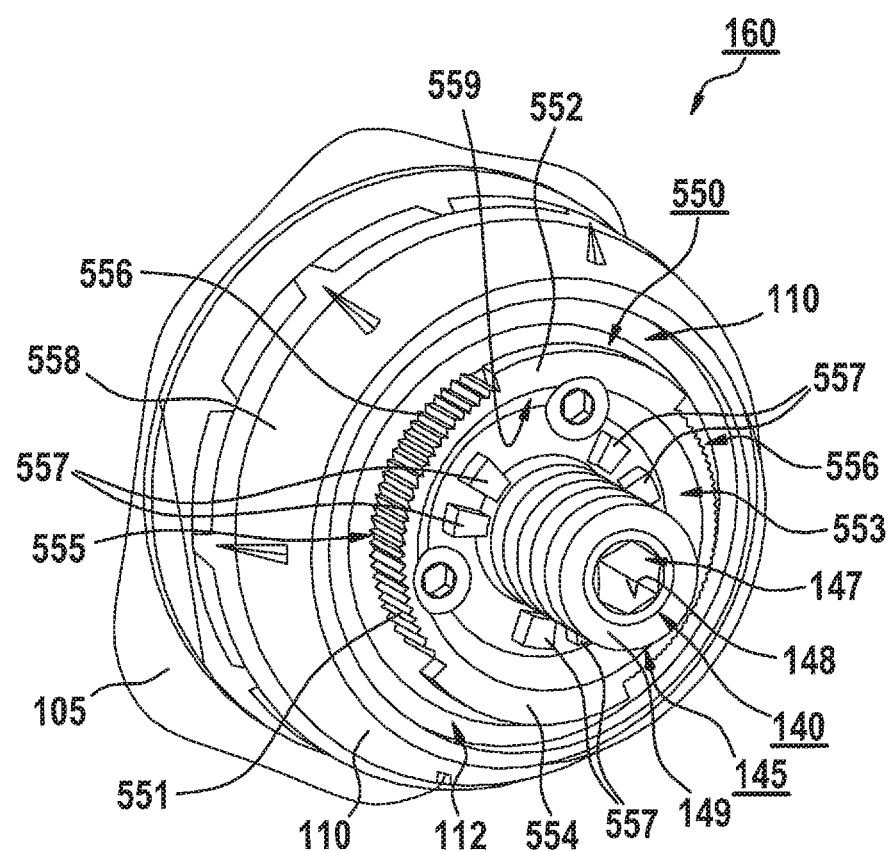
FIG. 2 shows a perspective view of the tool receptacle and the fastening interface of the handheld power tool from FIG. 1.

FIG. 2 shows enlarged section 160 of handheld power tool 100 from FIG. 1 having tool receptacle 140, which includes bit holder 145, for example, and is provided here as an illustration with a hexagon socket 147 and a locking element 148, which is associated with hexagon socket 147, for screwdriver bit 151 from FIG. 1, and with a fastening interface 550, also referred to hereafter as a "machine interface." This is fastened as an illustration in the area of bit holder 145 on tool housing 105 and/or on gear housing 110 of handheld power tool 100 from FIG. 1 so it is axially and radially immovable and is non-rotating. However, it is to be noted that machine interface 550 is configured, solely as an example, as a separate component and alternatively thereto may also be formed integrally with tool housing 105 and/or gear housing 110.

Machine interface 550 is used for the non-rotating fastening of an associated tool attachment (600 in FIGS. 3, 4) and has, as an illustration, a fastening element 551 fastened in a non-rotating way on end face 112 of tool housing 105 and/or on gear housing 110. This fastening element is configured, for example, as at least sectionally sleeve-shaped or ring-shaped and is fastened in the area of a torque setting sleeve 558, which is situated in a ring shape on end face 112 of tool housing 105 and is associated with optional torque clutch 199 of FIG. 1, using suitable fastening elements, for example, screws or rivets, but may alternatively thereto also be formed integrally with tool housing 105 and/or gear housing 110. Fastening element 551 may at least sectionally enclose bit holder 145 with a predefined radial spacing, to enable axial displacement of locking sleeve 149 of bit holder 145 in the interior of fastening element 551.

Fastening element 551 has, on its outer circumference, at least one blocking element 555 and at least two holding elements 552, 554. Blocking element 555 may have at least one set of blocking teeth 556 and the at least two holding elements 552, 554 are configured, for example, like bayonets to form a bayonet fitting. However, it is to be noted that the description of such a bayonet fitting merely has exemplary character and is not intended as a restriction of the present invention. Rather, alternative fastening options may also be used in machine interface 550, in which a corresponding tool attachment (600 in FIG. 4) is fastenable via a rotational movement on machine interface 550, for example, a so-called wire clip lock, etc.

As an illustration, an at least sectionally conical centering aid 553 is provided on machine interface 550 for the axial centering of a locking unit (602 in FIG. 4) of an associated tool attachment (600 in FIG. 4), fastening element 551 being configured to enable the axial centering of associated tool attachment (600 in FIG. 4) on tool housing 105 and/or gear housing 110. For this purpose, a centering surface 559, which is ring-shaped, and is at least sectionally funnel-shaped for example, is provided on the inner circumference of fastening element 551 to form centering aid 553.

However, it is to be noted that centering surface 559 is only funnel-shaped as an example and this is not to be understood as a restriction of the present invention. Rather, a conical embodiment on an additional centering ring is also implementable. Accordingly, a reference to the term "cone-shaped" in the context of the present invention represents both a reference to a conical embodiment and also a funnel-shaped embodiment of a corresponding component. In addition, centering aid 553, instead of a single ring-shaped and funnel-shaped centering surface 559, may also have multiple cone-shaped arc sections, etc.

Furthermore, fastening element 551 has at least one and, for example, three optional angle setting elements 557. These are used to specify a predefined angle position, for example, when fastening a tool attachment, which is configured as an angled or eccentric attachment, on machine interface 550.

Figure 3:
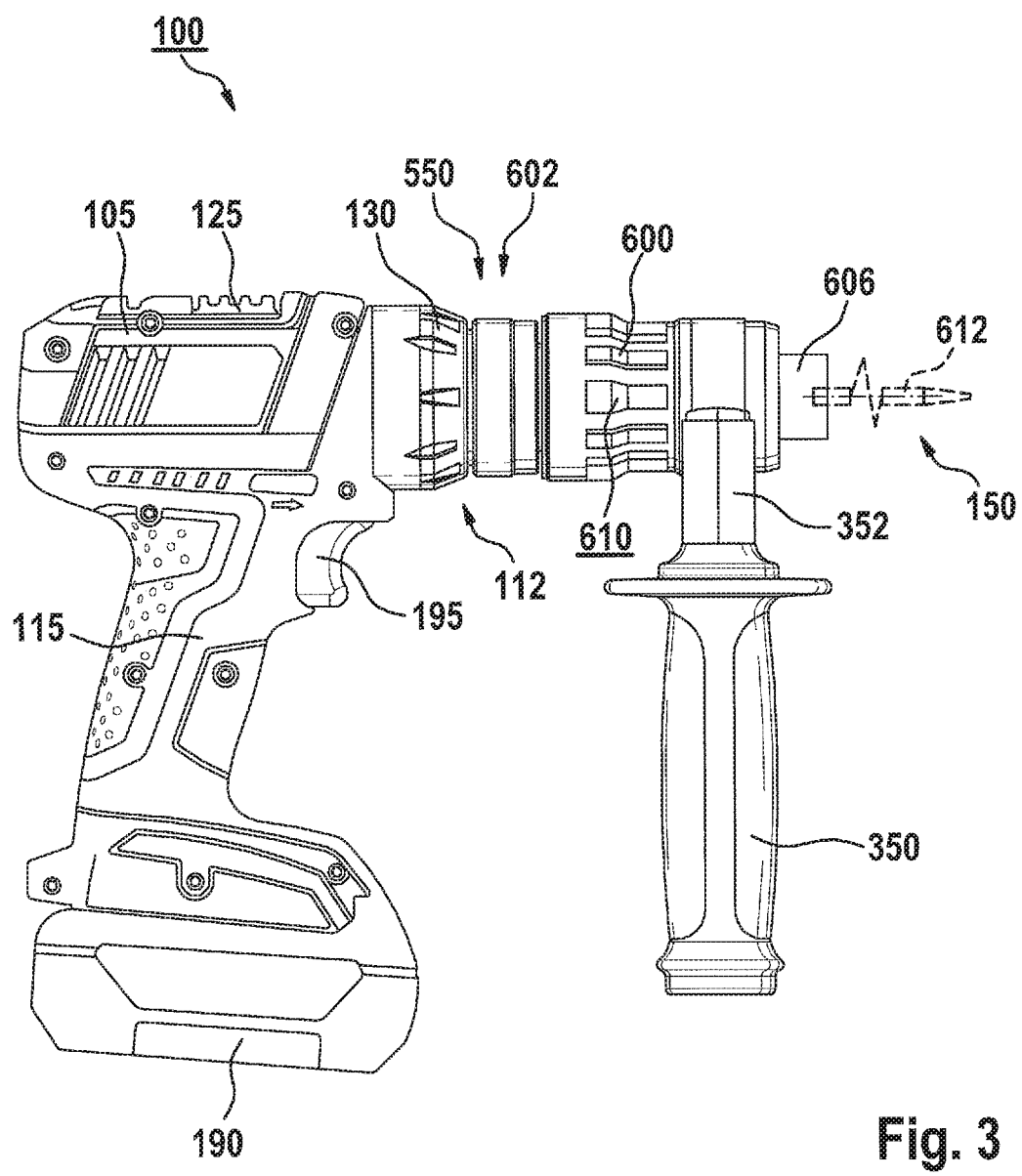
FIG. 3 shows a side view of the handheld power tool from FIG. 1 having a replaceable tool attachment, which is configured as a chisel attachment, and an auxiliary handle.

FIG. 3 shows handheld power tool 100 from FIG. 1 including a replaceable tool attachment 600 and an auxiliary handle 350. Handheld power tool 100 has as an illustration, in addition to the above-described components, on the one hand, a sliding switch 125 on tool housing 105, which is used to enable a gear change of gear mechanism 109 from FIG. 1 and, on the other hand, a rubberized rotating ring 130 for setting a torque value, from which optional torque clutch 199 from FIG. 1 responds during operation.

According to one specific embodiment, tool attachment 600, which may be configured as a so-called "in-line percussion attachment" or "in-line chisel attachment," is fastened with the aid of an attachment interface 602, which is formed on an attachment housing 610 of tool attachment 600, on fastening interface 550 provided in the area of end face 112 of tool housing 105. Insert tool 150 from FIG. 1, which is a chisel 612 as an example here, is accommodated in a tool receptacle 606 of tool attachment 600. Furthermore, an auxiliary handle 350 and a fastening aid 352 are provided on attachment housing 610. Auxiliary handle 350 enables a two-handed operation of handheld power tool 100 including tool attachment 600 fastened thereon, while fastening aid 352 is used for temporary fastening on an item of clothing, for example, a belt or a trouser or jacket pocket. For this purpose, auxiliary handle 350 may be disconnected from fastening aid 352 if needed.

Figure 4:
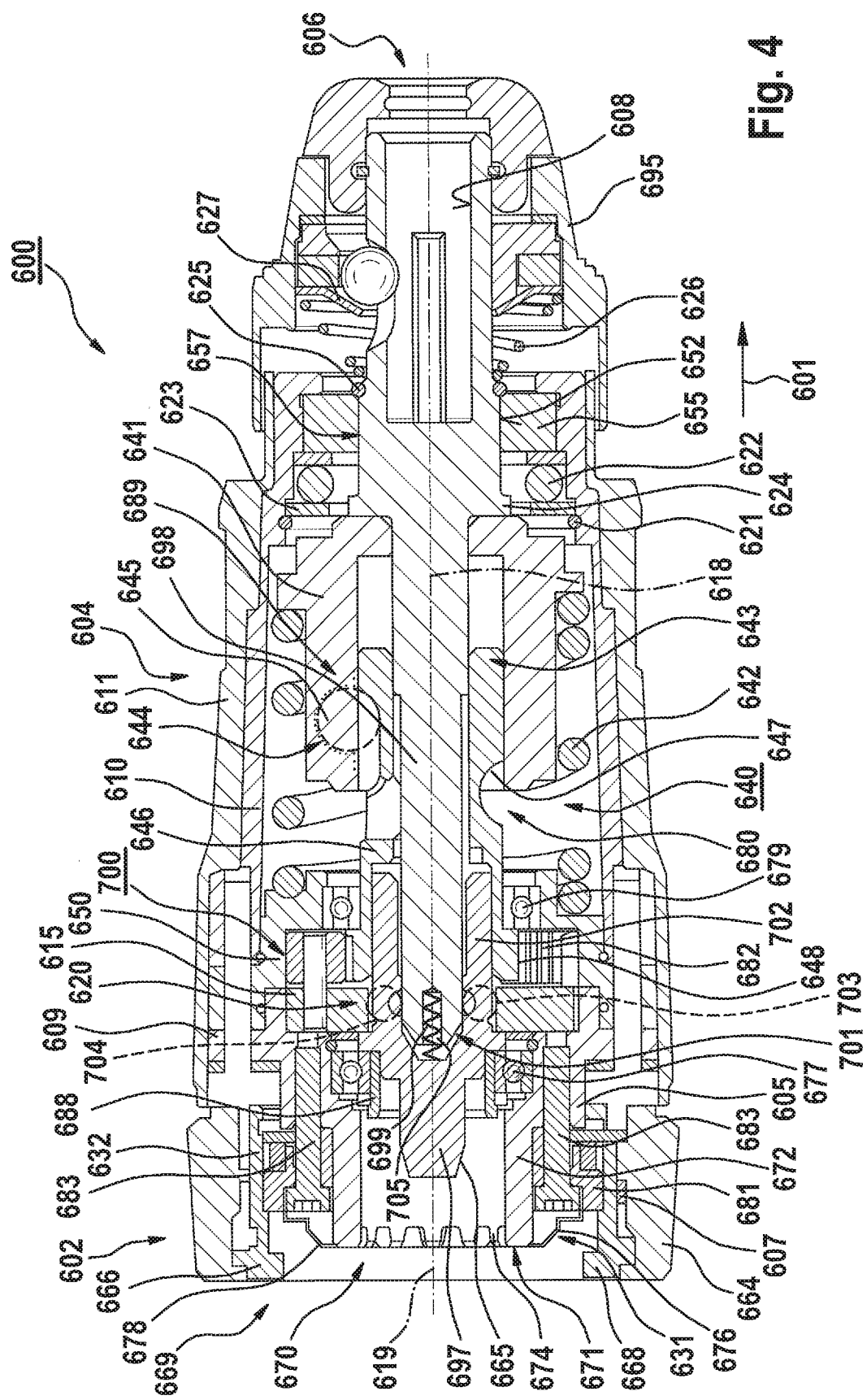
FIG. 4 shows a longitudinal section through the tool attachment from FIG. 3.

FIG. 4 shows tool attachment 600 from FIG. 3, fastening interface 602, which is referred to hereafter for the purpose of clarity of the description as an "attachment interface" as an example, a drive unit 604 also referred to hereafter as a "drive section," and a tool receptacle 606, also referred to hereafter as a "receptacle section." As an illustration, it has an SDS-plus or SDS-quick receptacle 608, which is provided with a locking or actuating sleeve 695, for the accommodation of chisel 612 from FIG. 3, but may also have any arbitrary other receptacle, for example, a HEX receptacle, etc. Drive unit 604 has, for example, a percussion mechanism 640 configured as a mechanical percussion mechanism. Therefore, tool attachment 600 is also referred to in the further continuation of the description as "percussion mechanism attachment 600" to simplify the description.

Drive section 604 includes, for example, an attachment housing 610, which may have an external, for example, rubberized grip area 611. A drive element 697, which is associated with percussion mechanism 640 and is rotatably drivable, is rotatably movably supported in a bearing element 677 in attachment housing 610. Drive element 697 may be situated coaxially in relation to receptacle section 606 and is used to drive an output element 698 via an associated, which may be actuatable gear mechanism 700 and percussion mechanism 640, output element 698 being supported according to the present invention inside attachment housing 610 in a non-rotating way at least during percussion operation. For this purpose, output element 698 has a guide section 652, which is at least sectionally enclosed by a tool receptacle holder 655, which is associated with attachment housing 610. An engagement contour 657 is at least sectionally provided between guide section 652 and tool receptacle holder 655 to provide a rotatably-fixed coupling, at least during percussion operation of tool attachment 600, between tool receptacle holder 655 and guide section 652, which is fastened in attachment housing 610. In addition, a ring flange 624 is formed on output element 698 in the area of tool receptacle 655 on the axial side thereof facing toward percussion mechanism 640, to prevent output element 698 from slipping out of attachment housing 610. A support ring 625 for supporting a spring element 626, which is in contact against a plate-shaped application element 627 situated in receptacle section 606 or in locking or actuating sleeve 695 thereof, contacts the axial side of tool receptacle holder 655 facing away from percussion mechanism 640. Spring element 626, which is configured as a compression spring in the form of a truncated cone, pre-tensions locking or actuating sleeve 695 via application element 627 in an axial direction pointing away from attachment housing 610, as indicated with an arrow 601.

Output element 698 may be an output spindle, which is associated with receptacle section 606 and is rotatable about a rotation axis 619, rotation axis 619 being coincident with a corresponding drive axle 618 of percussion mechanism 640 or a corresponding rotation axis of drive element 697. Accordingly, percussion mechanism 640 is configured as a so-called "in-line percussion mechanism" for the direct percussive drive of output element 698 or of the drive spindle during percussion operation of percussion mechanism attachment 600, output element 698 or the output spindle being configured to transmit corresponding percussion pulses directly to insert tool 150, which is inserted therein, or chisel 612 of FIG. 3. To attenuate the percussion pulses or feedback resulting in this way on attachment housing 610 and to attenuate vibrations transmitted through receptacle section 606 to attachment housing 610, an attenuator 622 is provided in attachment housing 610, which is fixed in the area of tool receptacle holder 655 via a securing element 621, which may be configured as a lock ring, and a circular washer component 623.

Percussion mechanism 640 has a percussion body 641, which is acted upon with the aid of a spring element 642, and is coupled via a ball guide 680 and a spherical tensioning element 645 with an associated spring tensioning element 646. Spring element 642 may be configured as a cylindrical compression spring. Percussion body 641 may be provided for carrying out axially aligned percussions, i.e., percussions in the direction of arrow 601, against output element 698 or the output spindle. Spring tensioning element 646 is sleeve-shaped, for example, and its front axial end 643, which faces toward percussion body 641, is received therein, spherical tensioning element 645 being situated in the area between spring tensioning element 646 and percussion body 641. This tensioning element is, on the one hand, situated in a radial recess 644 of percussion body 641 and may, on the other hand, roll off in a control curve 647 formed on the inner circumference of spring tensioning element 646. The position of spherical tensioning element 645 shown in FIG. 4 corresponds as an illustration to a relaxed idle position 689 of percussion mechanism 640, in which, after the execution of an axial percussion of percussion body 641 against output element 698, spring element 642 is maximally expanded and percussion body 641 contacts ring flange 624 of output element 698. After the completion of each axial percussion, a further axial percussion is carried out by the relaxation of spherical tensioning element 645 and the renewed tensioning or compression thus caused of spring element 642 with the aid of rotating spring tensioning element 646.

On its axial end facing away from percussion body 641, spring tensioning element 646 accommodates drive element 697, spring tensioning element 646 being rotatably movably situated thereon and therefore independently of drive element 697. Actuatable gear mechanism 700 may be used for driving spring tensioning element 646, this gear mechanism being actuatable at least during percussion operation of percussion mechanism 640 and being configured here as an example as a single-stage planetary gear mechanism having a planet carrier 615, which is drivable by drive element 697, and multiple planetary wheels 682. These are drive-coupled via rotary entrainment gear teeth 648 with spring tensioning element 646 and situated in an associated annulus gear 650. This annulus gear is situated fixed in the housing and non-rotating in attachment housing 610 and has an axial end facing toward percussion body 641, in which a further bearing element 679, for example, a rolling bearing, for the rotatably-movable support of spring tensioning element 646 may be situated so it is radially and axially immobile, and an axial end, which faces away from percussion body 641 and faces toward attachment interface 602, on which planetary wheels 682 engage.

An engagement clutch 620, which may be actuatable against the spring force of a spring element 699 by an axial displacement of output element 698 or the output spindle, is provided for activating the percussion operation of percussion mechanism 640. For this purpose, output element 698 is axially pre-tensioned with the aid of spring element 699, which may be configured as a compression spring, in a direction pointing away from locking unit 669 or in the direction of arrow 601. Engagement clutch 620 is configured to enable a drive of spring tensioning element 646 for the periodic tensioning and relaxation of spring element 642, i.e., the activation of the percussion operation, in the case of an actuation against the force action exerted by spring element 699. To achieve the actuation of engagement clutch 620 by axial insertion of output element 698—for example, by pressing an insert tool, which is accommodated in tool receptacle 606, against a workpiece to be machined—it may have an approximately conical axial end 701, which is accommodated in an approximately cylindrical borehole 702 of drive element 697. With the aid of cone-shaped axial end 701, after overcoming the spring force exerted by spring element 699, at least two spherical coupling bodies 703, 704 for turning on the percussion operation are pressed radially outward enough that a form-fit connection is established between drive element 697 and planet carrier 615 of gear mechanism 700. Spring element 699 is sectionally accommodated in a small borehole 705 in free axial end 701 of output element 698 or the output spindle for securing it in position or for guiding it, and is supported on a borehole bottom (not shown in greater detail) of borehole 702 of drive element 697.

The functionality of percussion mechanism 640 and further details of components thereof are described, for example, in DE 10 2013 208 882.5, the content of the disclosure of which is explicitly incorporated in the present description, so that a comprehensive description thereof may be omitted here for the purpose of conciseness of the description.

A free axial end of drive element 697, which faces away from drive section 604, at least sectionally has a hexagonal outer circumference 665. An at least regionally sleeve-shaped or tubular angle setting element 672, through which drive element 697 at least sectionally engages, is situated coaxially inside locking unit 669. This angle setting element 672 may be connected rigidly, i.e., axially and radially immovably, to attachment housing 610 and/or formed integrally therewith. As an illustration, angle setting element 672 has, on its axial end facing toward drive section 604, an outer ring collar 609, which is situated radially and axially immovably in attachment housing 610, for example, by a press-fit or clamping, and axially contacts annulus gear 650 of gear mechanism 700. This ring collar 609 may be configured on its inner circumference as a receptacle for planet carrier 615. Frontal angle setting teeth 674 may be provided on its other axial end 671.

Furthermore, an actuating element 688 is formed on drive element 697, which at least sectionally encloses drive element 697 in a sleeve shape and is used for the axial application of locking sleeve 149 from FIG. 2 during the coupling or decoupling of tool attachment 600. Alternatively thereto, drive element 697 and actuating element 688 may also be formed in two parts or multiple parts. Actuating element 688 is situated, for example, in the interior of angle setting element 672 and may be spaced apart uniformly therefrom radially on all sides.

Attachment interface 602 is used for the producible and detachable fastening of percussion mechanism attachment 600 on an associated handheld power tool, for example, handheld power tool 100 from FIG. 1, or its machine interface 550 from FIG. 2, and has, as an illustration, an angle position setting unit 670, which is associated with angle setting element 672, and a locking unit 669. Locking unit 669 is configured, in a locked state, to lock tool attachment 600 for operation on handheld power tool in a predefined angle position thereon and, in an unlocked state, to enable withdrawal of percussion mechanism attachment 600 from the handheld power tool. Angle position setting unit 670 is configured to enable setting of the predefined angle position of percussion mechanism attachment 600 for operation on the handheld power tool. In this case, angle position setting unit 670 may be actuatable in the locked state of locking unit 669 to enable a change of the predefined angle position. Such an actuation for changing the predefined angle position may be carried out by a combined longitudinal and rotational movement of attachment housing 610.

Locking unit 669 has a locking body 632 and a spring-loaded centering body 681, which is rotatably movably supported therein. This centering body 681 is fastened in a non-rotating way via suitable fastening elements 683, for example, screws, on an axial end collar 605 of angle setting element 672, in which bearing element 677 is situated. On an axial end of centering body 681 facing away from drive section 604, it has at least one centering element 631, which includes, for example, at least two curved centering areas 676, 678, which are beveled in the longitudinal direction of percussion mechanism attachment 600, i.e., opposite to direction 601. However, it is to be noted that centering element 631 has the two centering areas 676, 678 merely as an example and not to restrict the present invention. Centering element 631 may rather also have a single centering area, which is formed like a truncated cone.

Locking body 632 may have at least two locking elements 666, 668, which are configured, for example, like bayonets to form a bayonet fitting. Furthermore, an actuating ring 664 is situated as an example on the outer circumference of this locking body 632, which is actuatable to lock locking body 632 on the handheld power tool, locking body 632 and actuating ring 664 being able to be integrally formed.

An optional, at least in areas elastic blocking and locking element 607 may be situated in the area between locking body 632 and actuating ring 664. It is at least sectionally fixed in position on locking body 632 and/or actuating ring 664 and is configured, in the locked state of locking unit 669, to prevent twisting of locking body 632 from its locked position into its unlocked position, blocking and locking element 607 cooperating with blocking element 555 from FIG. 2, which is associated with machine interface 550 from FIG. 2. In this case, actuating ring 664 may be configured to at least sectionally apply blocking and locking element 607 to machine interface 550 from FIG. 2 in the locked state of locking unit 669. Blocking and locking element 607 is configured in this case to lock actuating ring 664 in a locking position on locking body 632 in the locked state of locking unit 669, to prevent independent twisting or loosening of actuating ring 664 in relation to locking body 632.

Figure 5:
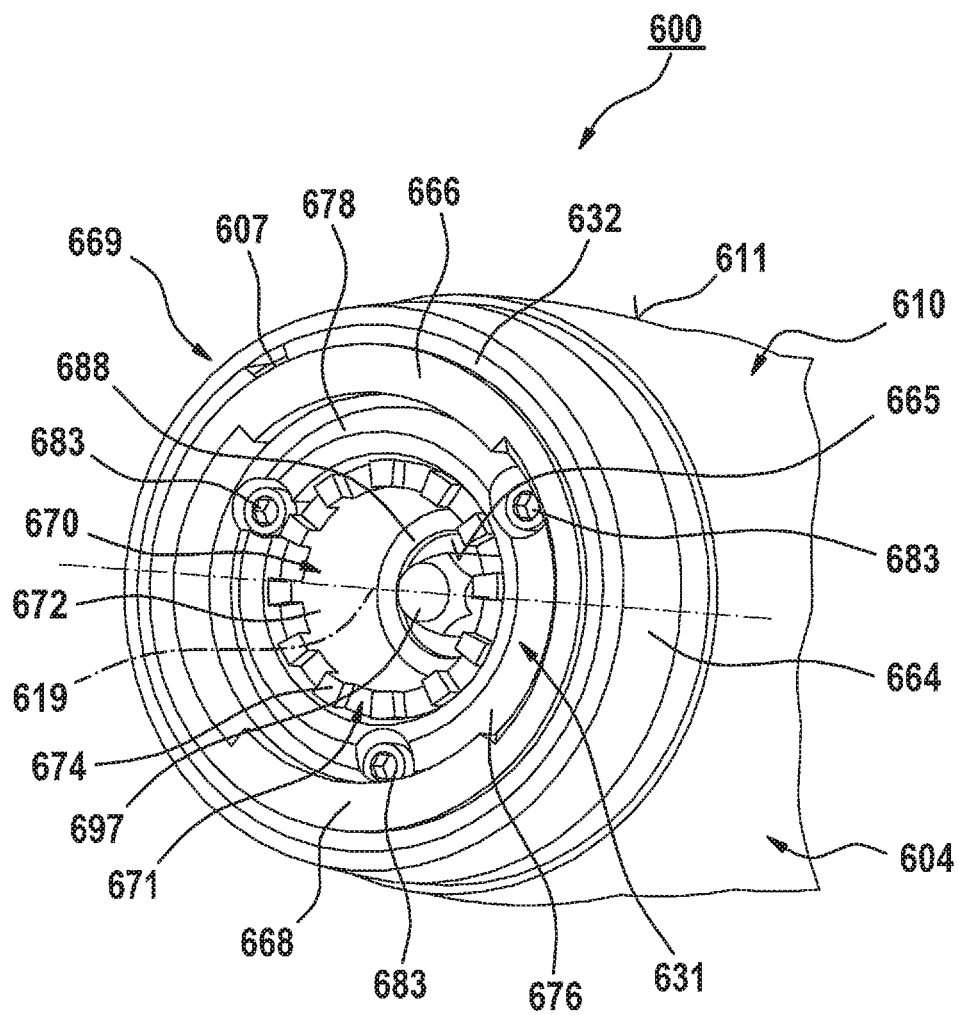
FIG. 5 shows a top view of an attachment interface of the tool attachment from FIG. 4.

FIG. 5 shows tool attachment 600, which has locking unit 669, which is twistable by the user with the aid of actuating ring 664 for locking on machine interface 550 from FIG. 2. For this purpose, locking unit 669 has approximately ring-shaped locking body 632, on which two diametrically situated locking elements 666, 668, which are each configured in the form of bayonets, are provided. Locking body 632, which is rotatable with the aid of actuating ring 664, is situated concentrically in relation to rotation axis 619 of drive element 697 in this case.

As described above, drive element 697 of tool attachment 600 may have a hexagonal outer circumference 665 for establishing a rotatably fixed, but axially movable form-fit connection to tool receptacle 140 of machine interface 550 from FIG. 2. Rubberized grip area 611 may be provided on attachment housing 610 at least in the area of drive unit 604 to optimize the operating comfort.

What is claimed is:

1. A tool attachment for a handheld power tool, having a tool housing having a fastening interface, comprising:
   a tool attachment arrangement, including:
      an attachment housing, on which a locking unit, for locking the tool attachment arrangement on the fastening interface of the handheld power tool; and
      a tool receptacle to accommodate an insert tool;
   wherein a percussion mechanism is situated in the attachment housing, which is configured to apply percussions carried out in the axial direction in relation to the tool receptacle to the insert tool, which is situated in the tool receptacle, during percussion operation of the tool attachment, and
   wherein the tool receptacle is fixed in position in the attachment housing in a non-rotating manner at least during percussion operation,
   wherein the tool attachment has an output element which is embodied as an output spindle rotatable about an associated rotation axis and fixed in position in the attachment housing in a non-rotating manner at least during percussion operation, and wherein the rotation axis is coincident with a drive axle of the percussion mechanism,
   wherein the tool receptacle is associated with the output spindle,
   wherein the percussion mechanism includes a percussion body which is configured to directly percussively drive the output spindle during percussion operation of the tool attachment, and wherein the output spindle is configured to transmit percussions carried out in the axial direction in relation to the tool receptacle directly onto the insert tool situated in the tool receptacle, the output spindle is axially pre-tensioned with a spring element in a direction pointing away from the locking unit,
   wherein the output spindle has a radial extension, wherein the percussion body directly strikes the radial extension during percussion operation of the tool attachment.

2. The tool attachment of claim 1, wherein a drive element is situated coaxially in relation to the tool receptacle and is associated with the percussion mechanism.

3. The tool attachment of claim 2, wherein the drive element at least sectionally has a hexagonal outer circumference.

4. The tool attachment of claim 1, wherein the percussion body is spring-loaded by the spring element, and is coupled via a ball guide with an associated spring tensioning element.

5. The tool attachment of claim 4, wherein the percussion mechanism has an actuatable engagement clutch for activating the percussion operation of the percussion mechanism.

6. The tool attachment of claim 5, wherein the engagement clutch is configured to enable a drive of the spring tensioning element for the periodic tensioning and relaxation of the spring element in the event of an actuation against the force action exerted by the spring element.

7. The tool attachment of claim 1, wherein the output element has a guide section, which is at least sectionally enclosed by a tool receptacle holder associated with the attachment housing, and wherein an engagement contour is at least sectionally provided between the guide section and the tool receptacle holder to provide a rotatably-fixed coupling between the tool receptacle holder and the guide section at least during percussion operation of the tool attachment.

8. The tool attachment of claim 1, wherein the percussion body is spring-loaded by the spring element, and is coupled with an associated spring tensioning element, and wherein a gear mechanism is situated in the attachment housing, which is configured to increase a speed of the spring tensioning element in relation to a speed of a drive element.

9. The tool attachment of claim 1, wherein at least one of an auxiliary handle and a fastening aid is fastenable on the attachment housing.

10. The tool attachment of claim 1, wherein the tool receptacle is configured to accommodate at least one of an SDS-plus insert tool, an SDS-quick insert tool, and a HEX-insert tool.

11. The tool attachment of claim 10, wherein the insert tool is configured as a chisel.

12. The tool attachment of claim 1, wherein the radial extension is embodied as a ring flange.

13. A tool system, comprising:
a handheld power tool, which includes a tool housing having a fastening interface, and having a replaceable tool attachment;
wherein the tool attachment, includes a tool attachment arrangement, including:
an attachment housing, on which a locking unit, for locking the tool attachment arrangement on the fastening interface of the handheld power tool, and
a tool receptacle to accommodate an insert tool,
wherein a percussion mechanism is situated in the attachment housing, which is configured to apply percussions carried out in the axial direction in relation to the tool receptacle to the insert tool, which is situated in the tool receptacle, during percussion operation of the tool attachment, and
wherein the tool receptacle is fixed in position in the attachment housing in a non-rotating manner at least during percussion operation,
wherein the tool attachment has an output element which is embodied as an output spindle rotatable about an associated rotation axis and fixed in position in the attachment housing in a non-rotating manner at least during percussion operation, and wherein the rotation axis is coincident with a drive axle of the percussion mechanism,
wherein the tool receptacle is associated with the output spindle,
wherein the percussion mechanism includes a percussion body which is configured to directly percussively drive the output spindle during percussion operation of the tool attachment, and wherein the output spindle is configured to transmit percussions carried out in the axial direction in relation to the tool receptacle directly onto the insert tool situated in the tool receptacle, the output spindle is axially pre-tensioned with a spring element in a direction pointing away from the locking unit,
wherein the output spindle has a radial extension, wherein the percussion body directly strikes the radial extension during percussion operation of the tool attachment.

14. A tool attachment for a handheld power tool, having a tool housing having a fastening interface, comprising:
a tool attachment arrangement, including:
an attachment housing, on which a locking unit, for locking the tool attachment arrangement on the fastening interface of the handheld power tool; and
a tool receptacle to accommodate an insert tool;
wherein a percussion mechanism is situated in the attachment housing, which is configured to apply percussions carried out in the axial direction in relation to the tool receptacle to an insert tool, which is situated in the tool receptacle, during percussion operation of the tool attachment, and
wherein the tool receptacle is fixed in position in the attachment housing in a non-rotating manner at least during percussion operation,
wherein the tool attachment has an output element which is embodied as an output spindle rotatable about an associated rotation axis and fixed in position in the attachment housing in a non-rotating manner at least during percussion operation, and wherein the rotation axis is coincident with a drive axle of the percussion mechanism,
wherein the output spindle has a guide section, which is at least sectionally enclosed by a tool receptacle holder associated with the attachment housing, and wherein an engagement contour is at least sectionally provided between the guide section and the tool receptacle holder to provide a rotatably-fixed coupling between the tool receptacle holder and the guide section at least during percussion operation of the tool attachment,
wherein the output spindle has a radial extension, wherein the percussion body directly strikes the radial extension during percussion operation of the tool attachment.

* * * * *